United States Patent [19]
Kang et al.

[11] Patent Number: 5,539,490
[45] Date of Patent: Jul. 23, 1996

[54] CAMERA FINDER SYSTEM AND RELATED CONTROL METHOD

[75] Inventors: Hyeong-won Kang; Pyeong-deok Nam, both of Changwon-si, Rep. of Korea

[73] Assignee: Samsung Aerospace Industries, Ltd., Kyeongsangnam-do, Rep. of Korea

[21] Appl. No.: 274,478

[22] Filed: Jul. 13, 1994

[30]     Foreign Application Priority Data

Jul. 13, 1993 [KR] Rep. of Korea ................. 93-13149

[51] Int. Cl.⁶ ..................... G03B 13/02; G03B 3/00; G03B 17/04
[52] U.S. Cl. .................. 354/223; 354/187; 354/199; 354/219
[58] Field of Search ................... 354/187, 219, 354/199, 222, 223; 348/341

[56]         References Cited
U.S. PATENT DOCUMENTS

| 4,945,372 | 7/1990 | Higuchi et al. | 354/199 |
| 5,335,030 | 8/1994 | Suzuka | 354/149.1 |

FOREIGN PATENT DOCUMENTS

| 6102562 | 4/1994 | Japan | 354/219 |
| 479885 | 11/1969 | Switzerland | 354/219 |

Primary Examiner—Michael L. Gellner
Assistant Examiner—Daniel G. Chapik
Attorney, Agent, or Firm—Finnegan, Henderson, Farabow, Garrett & Dunner

[57]          ABSTRACT

A camera having a camera finder system including a finder housing having a camera finder. The camera further includes a movable housing linearly movable into the finder housing whereby the camera finder is moved forward out of a camera body or backward into the finder housing of the camera; and drive device for linearly moving the movable housing.

29 Claims, 9 Drawing Sheets

| Section | Limit switch 43 | Limit switch 45 | Motor |
|---|---|---|---|
| Reception end stage | L | L | Stop |
| Finder being received | L | H | Rearward |
| Finder moving forward spirally | H | L | Forward |
| Protrusion end stage | H | H | Stop |

CAMERA FINDER SYSTEM AND RELATED CONTROL METHOD

BACKGROUND OF THE INVENTION

1. Field of the Invention

The present invention relates generally to a camera, and more particularly, to a camera finder system and related control method.

2. Description of Related Art

Generally, a camera finder is a device that indicates a range of an object photographed on film, and decides a position and composition of the object. Finders are classified into a (1) view finder for viewing a range of field and the position of the object, (2) a range finder-linked finder on which a range finder is mounted in the camera finder to determine visual field and control focal length, and (3) a reflex finder which confirms the range of the field of the object and controls the focal length by disposing a reflex mirror in a 45° angle behind a photographic lens of the camera. The reflex finder allows light, incident through the photographic lens, to be reflected on a focusing screen located at an upper part of the photographic lens.

The above-mentioned finder device is fixedly attached to a predetermined portions of the camera to determine a range of the object. Recently, the finder device has been miniaturized consistent with the compact camera trend. With the miniaturized finder device, for the user to determine the range of the object, the user's eyes must maintain the "eye relief" from an end of the eyepiece lens of the finder device.

As such, in a conventional compact camera, the nose undesirably contacts a backcover of the camera when the user attempts to determine the composition of an object, while maintaining the eye relief through the finder. This is inconvenient for the user and makes it difficult to take the photograph quickly and accurately.

Moreover, the conventional compact camera does not allow an effective use of camera space and an effective compact camera cannot be made because an entire length of the finder system is fixed even in a zoom camera, which uses a variable magnification and concurrently operates a variable power lens of the finder system to change the magnification of the finder. Also, since the user's nose contacts the back cover of the camera to secure the eye relief when taking a photograph of an object, desirable photographing cannot be carried out and the photographic range becomes inaccurate. Further, the visual field becomes narrow and the image of the object to be photographed cannot be obtained accurately when the user leaves the eye relief to avoid nose contact on the back cover of the camera.

SUMMARY OF THE INVENTION

An object of the present invention is to provide a camera finder system that overcomes the problems and disadvantages of the conventional devices.

The features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve this and other objects and in accordance with the purpose of the invention, as embodied and broadly described herein, a camera having a camera finder system includes a finder housing having a camera finder; a movable housing linearly movable into the finder housing whereby the camera finder is moved forward out of a camera body or backward into the finder housing of the camera; and drive means for linearly moving the movable housing.

In another aspect of the present invention, a camera having a camera finder system includes a movable lens barrel having a photographic lens therein; a finder housing having a plurality of lens and a circumferential surface; a movable housing having a plurality of eyepiece lens moved by the movable housing, the movable housing being movably attached to the circumferential surface of the finder housing; drive means for driving the lens barrel and movable housing; a first power transmission means for transferring a driving force from the drive means to the lens barrel; and a second power transmission means for transmitting the driving force from the drive means to the movable housing, the driving force of the drive means being respectively transferred to the lens barrel and movable housing through the first and second power transmission means, the lens barrel and movable housing being linearly moved.

In another aspect of the present invention, a camera having a camera finder system includes a finder housing having a plurality of lens; a movable housing having a plurality of lens moved by the movable housing and slidably receivable into the finder housing; and drive means for moving the movable housing forward and backward through a hole formed at a camera housing.

In another aspect of the present invention, a camera having a camera finder system includes a finder housing having a plurality of lens for a finder, a guide groove at each of two sides, and a spring sheet; a movable housing receivable into the finder housing having a guide projection exposed out through the guide groove at the two sides; an elastic member formed between the guide projection of the movable housing and the spring sheet of the finder housing, the electric member providing an elastic force to the movable housing; a guide rail having one end connected to the guide projection of the movable housing and another end slidably formed along a groove of a camera body; and a lever having a knob exposed out through a slide hole formed in the camera body at one end of the guide rail, the lever having an end portion contacting the guide projection at an initial position, the lever being slidable in a direction opposite the finder housing to release the contact between the end portion of the lever and the guide projection of the movable housing and move the movable housing out through another hole formed in the camera body by the elastic force of the elastic member.

According to a further aspect of the present invention, a method for controlling a finder of a camera includes checking whether power in the camera is sufficient; and supplying power to the camera to cause a motor in the camera to rotate in a forward direction to move the finder forward spirally from the body of the camera toward an eye of a user.

It is to be understood that both the foregoing general description and the following detailed description are exemplary and explanatory and are intended to provide further explanation of the invention as claimed.

The accompanying drawings, which are incorporated in and constitute a part of this specification, illustrate exemplary embodiments of the invention and together with the description, serve to explain the principles of the invention.

DETAIL DESCRIPTION OF THE PREFERRED EMBODIMENTS

Reference will now be made in detail to the preferred embodiments of the invention, examples of which are illustrated in the accompanying drawings.

Figure 1:
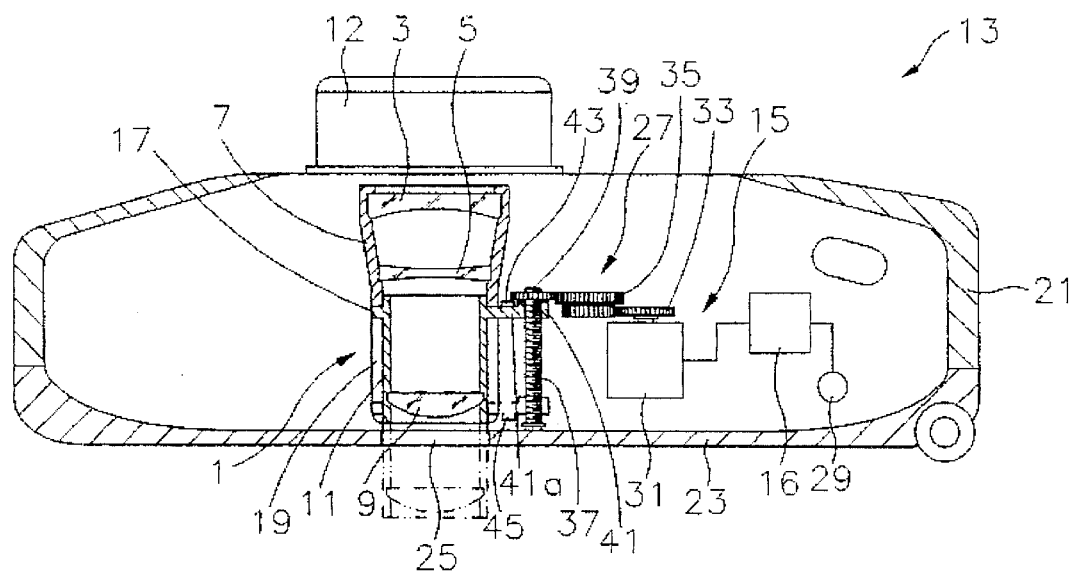
FIG. 1 is a transverse sectional view of a camera finder system according to a first preferred embodiment of the present invention.
Figure 2:
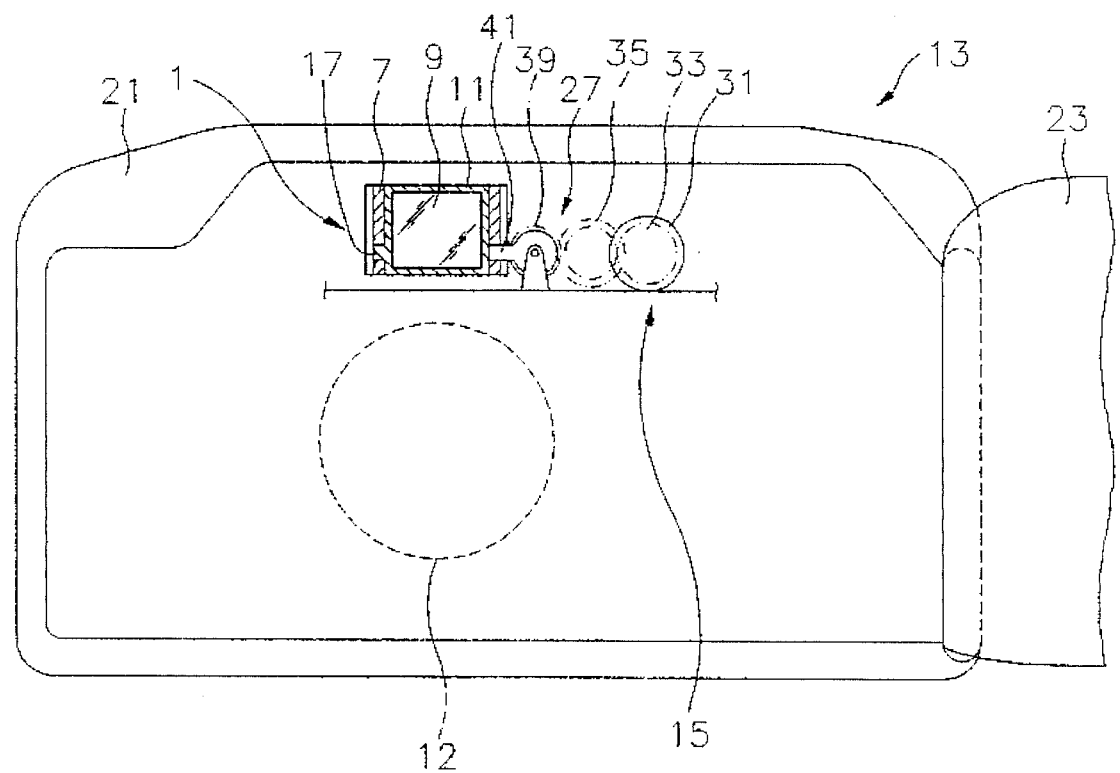
FIG. 2 is a vertical sectional view of the camera finder system according to the first preferred embodiment of the present invention.
Figures 3D, 3E:
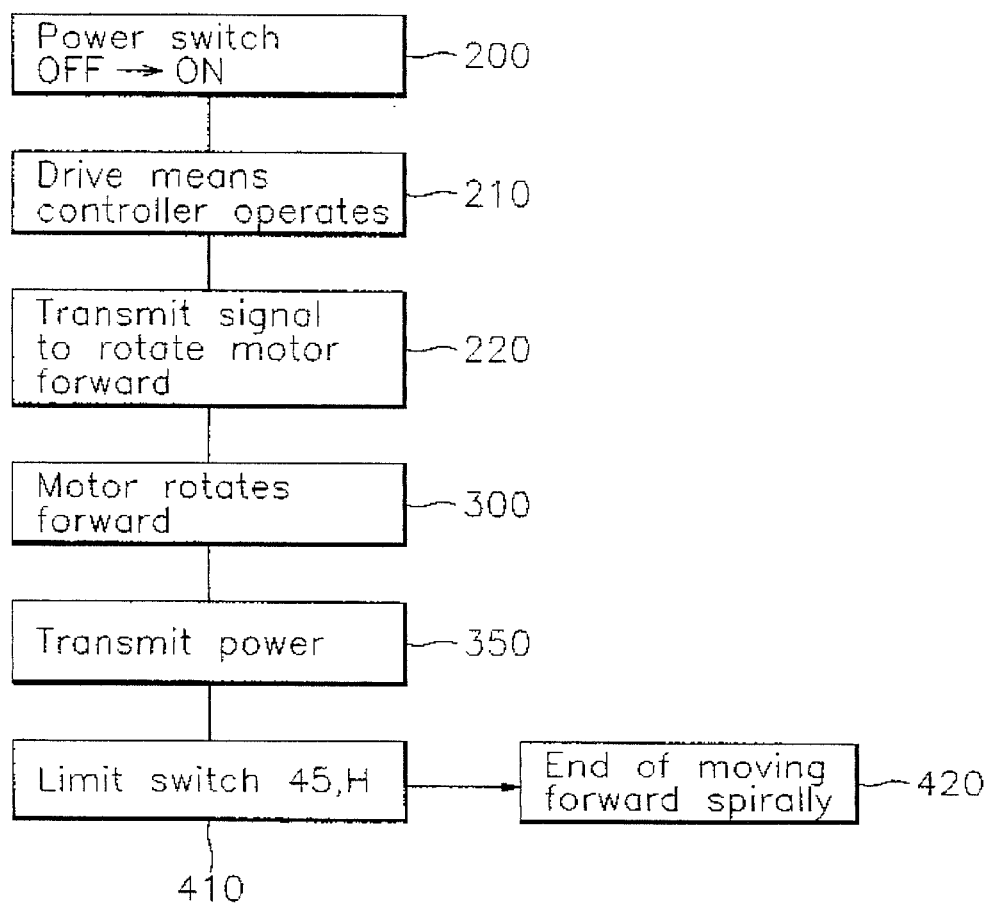
FIG. 3D shows operating states of a motor in accordance with a signal from the drive means controller according to the first preferred embodiment.
FIG. 3E is a flowchart showing a preferred operation according to the first preferred embodiment of the present invention when the finder is protruded.
Figure 3A:
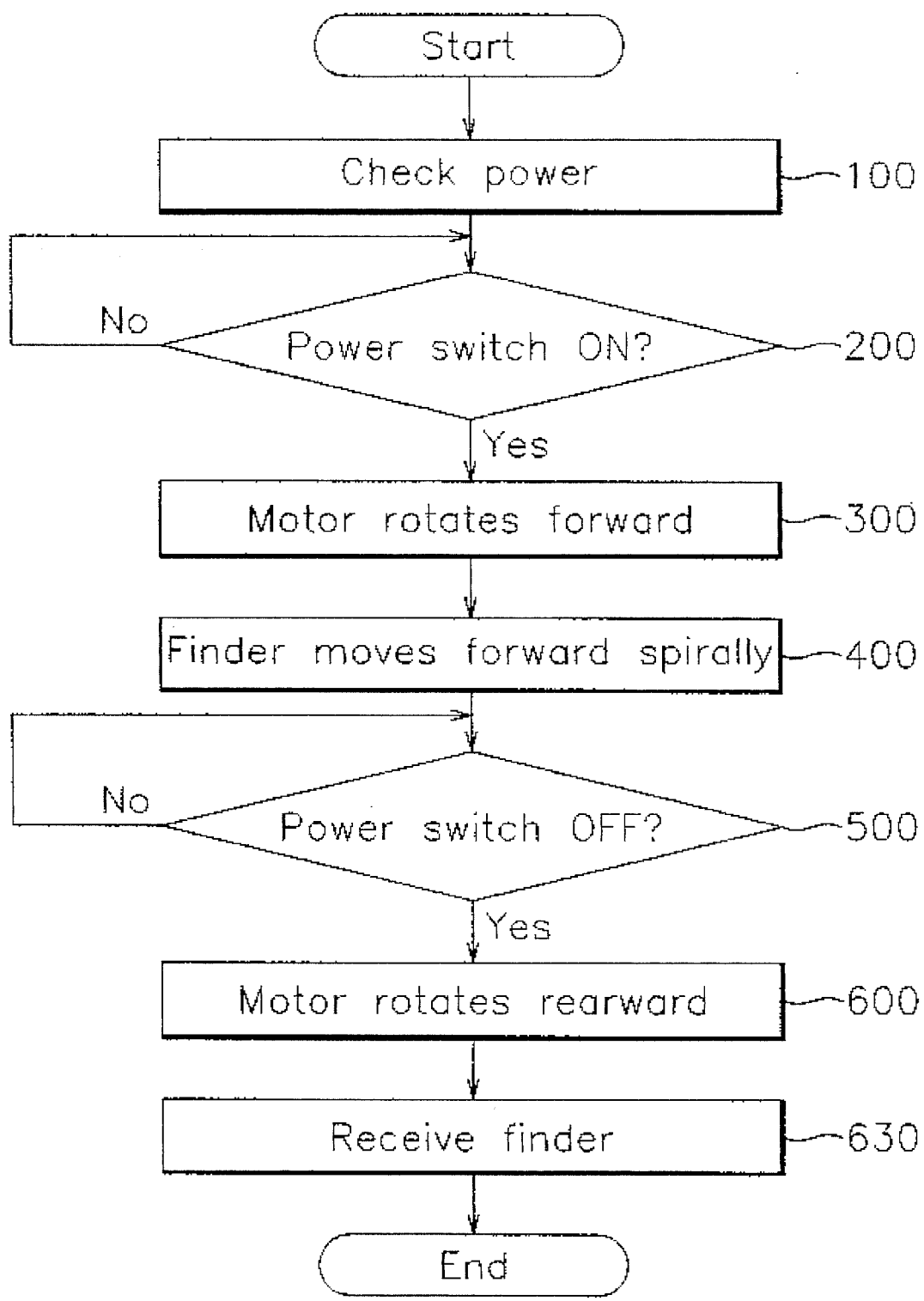
FIG. 3A is a flowchart showing a preferred operation of the camera finder system according to the first preferred embodiment of the present invention.
Figure 3B:
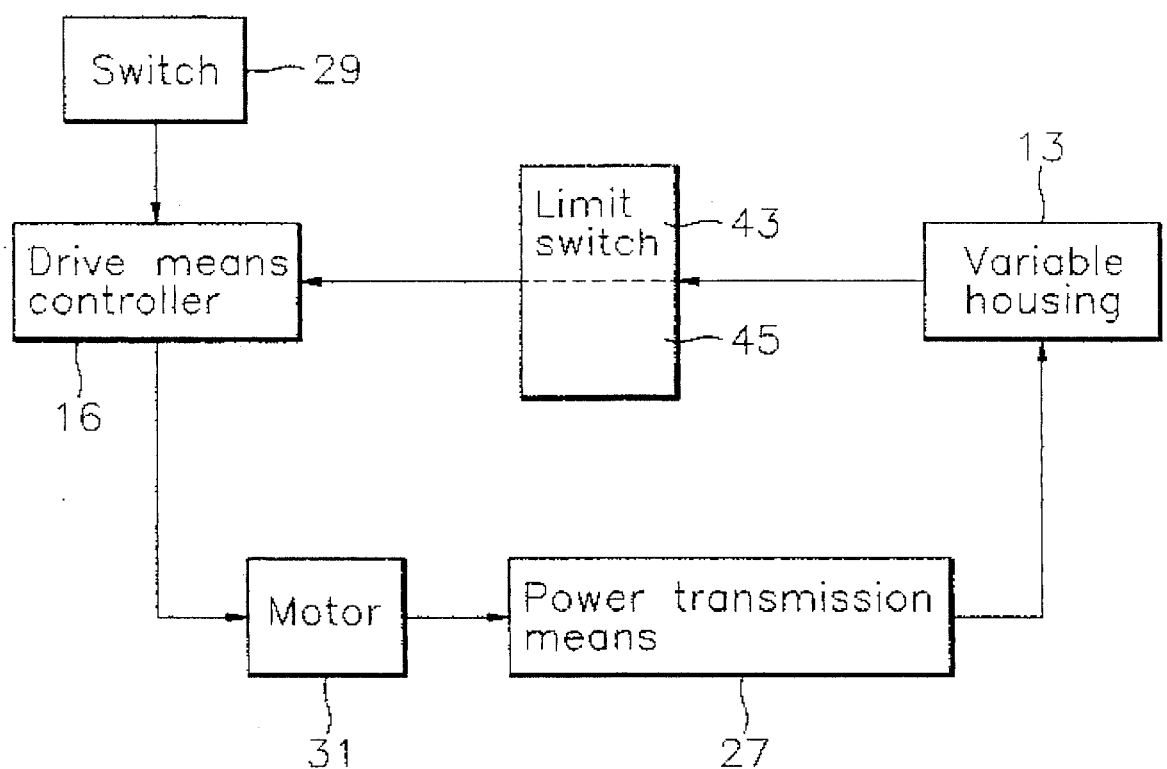
FIG. 3B is a block diagram of the camera finder system according to the first preferred embodiment of the present invention.
Figure 3C:
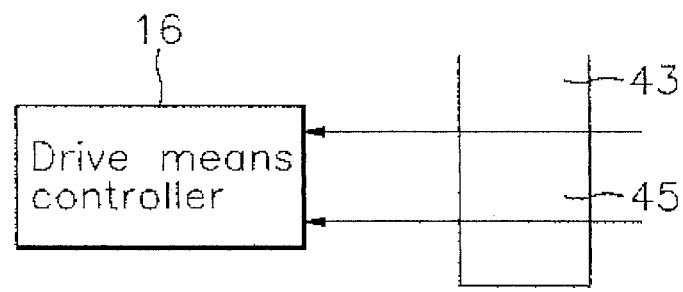
FIG. 3C is a block diagram showing the relationship between a drive means controller and switches of the first preferred embodiment.
Figure 3F:
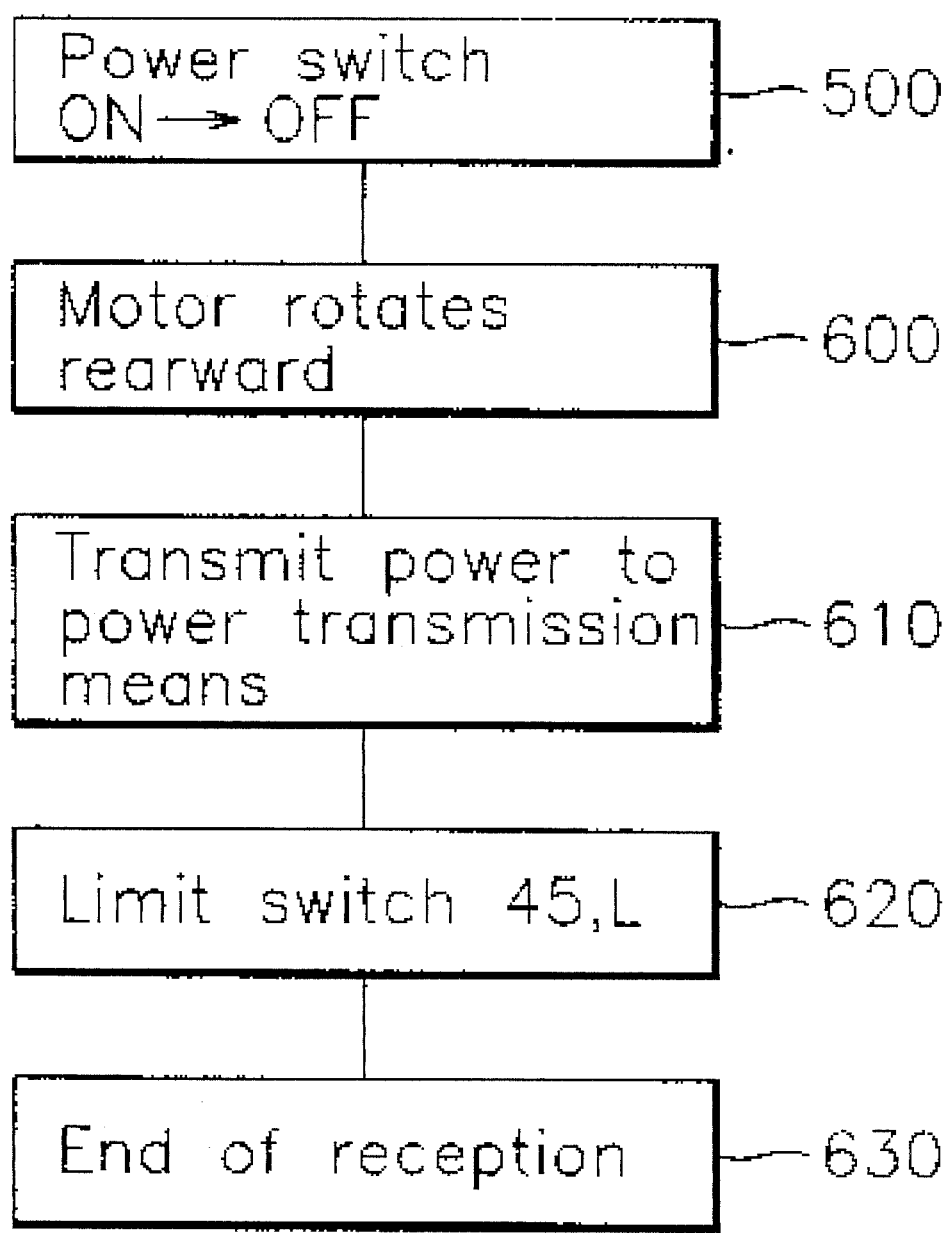
FIG. 3F is a flowchart showing a preferred operation according to the first preferred embodiment of the present invention when the finder is received.

Referring to FIGS. 1 and 2, a finder 1 has an objective lens 3, a finder housing 7 with one or more intermediate lenses 5 arranged within the finder housing 7, and a variable or movable housing 11 to which an eyepiece lens 9 is mounted. The finder 1 determines a range of an object and is formed on an upper part of a camera. The finder 1 forms an optical axis with the optical axis of a photographic lens 12.

The eyepiece lens 9 is mounted to the variable housing 11, which is slidably formed in the finder housing 7. The variable housing 11 selectively moves forward spirally (i.e, forward while rotating spirally) in response to an operation of a drive means 15 of the camera finder system. The variable housing 11 has a guide projection 17 formed on one side and is linearly guided along a guide groove 19 formed in the finder housing 7. The variable housing 11 protrudes out of the camera body through a hole 25 at the back cover 23, which is joined by a hinge to the front cover 21 and is selectively opened or closed. This makes it convenient for a user when determining the range of the object.

The camera finder system includes a power transmission means 27 for moving the variable housing 11 forward spirally, drive means 15 for driving the power transmission means 27, a drive means controller 16 for selectively controlling operations of the drive means 15, and a switch 29 for selectively operating the drive means 15.

The drive means 15 turns in response to the operation of the switch 29 and the turning motion is converted to a linear motion. Accordingly, the variable housing 11 can be guided into the finder housing 7 and also moved forward spirally outside the camera body 13.

The drive means 15 includes a motor 31, which can be rotated forward and backward. The power transmission means 27 reduces the number of rotations of the motor 31 through a driving gear 33 and a reduction gear group 35 provided on a rotor of the motor 31. The rotor transmits power to a driven gear 39 of a rotary member, such as ball screw 37, supporting the camera body 13. The ball screw 37 engages a linear transfer member, such as ball nut 41, connected to the variable housing 11 and a connecting member 41a, and the turning effect of the motor 31 is converted to linear motion.

Limit switches 43, 45 are formed at a predetermined position and electrically connected to a drive means controller 16. The switches 43, 45 restrict the forward movement of the eyepiece lens 9 by limiting a transfer distance of the ball nut 41, which engages the ball screw 37 and is linearly guided.

The operation of the camera finder system in accordance with the embodiment of the present invention, as described above, will be explained with reference to the accompanying drawings.

Referring to FIGS. 3A through 3F, when the camera power is checked (Step 100) and a power switch 29 is turned ON (Step 200), a low signal (L) from the switch 43 is converted to a high signal (H) in response to a power ON signal. The switch 45 continuously provides a low signal (L) to the drive means controller 16 and the drive means controller 16 is operated (Step 210). Subsequently, a signal of forward direction is transmitted to the motor 31 (Step 220). The signal of forward direction moves the variable housing 11 spirally forward. As the motor 31 rotates forward, the forward movement is carried out (Step 300). The reduction gear group 35 of the power transmission means 27 which is engaged with the driving gear 33 reduces the number of rotations of the motor 31. The turning effect of the motor 31 is transferred to the ball screw 37 (Step 350).

Accordingly, as the ball nut 41 engaged with the ball screw 37 is linearly moved, the finder moves forward (Step 400). This is shown by a dotted line in FIG. 1, in which the variable housing 11 is guided along the guide groove 19 in the finder housing 7 and moved forward spirally out of the camera body 13 through the hole 25 at the back cover 23. Concurrently, when the forward movement of the variable housing 11 ends, limit switches 43 and 45 both become high (H) (Step 410). The high signal (H) from switch 45 is transmitted to the drive means controller 16, the electric signal applied to the motor in the drive means 15, is blocked, the motor 31 is stopped, and the forward movement of the finder ends (Step 420).

As described above, when the forward movement of the variable housing 11 ends, it is convenient for the user to take the photograph of an object because the user's nose will not contact the back cover 23 when the user sees through the finder 1.

When the photographing is finished or the finder is not use the limit switches 43 and 45 respectively transmit low signals (L) to the drive means con,roller 16, and the motor 31 is rotated backward (Step 600) when the switch 29 is turned OFF to receive the finder (Step 500). Accordingly, the backward turning effect of the motor 31 is reduced to the predetermined rotation number by the reduction gear group 35 of the power transmission means 27 and the turning effect of the motor 31 is transferred to the ball screw 37. Thus, the ball nut 41 engaged with the ball screw 37 operates in reverse of the forward movement, the power is transmitted (Step 610), and the variable housing 11 is received into the finder housing 7.

Accordingly, when the reception of the variable housing 11 is complete, the limit switch 43 produces a low signal (L) (Step 620), and the low signal (L) is transmitted to the drive means controller 16. Subsequently, the operation of the motor 31 is stopped, such that the variable housing 11 is guided along the guide groove 19 in the finder housing 7 as indicated in a solid line in FIG. 1, thus completing the operation of receiving the finder into the finder housing 7 (Step 630).

Figure 4:
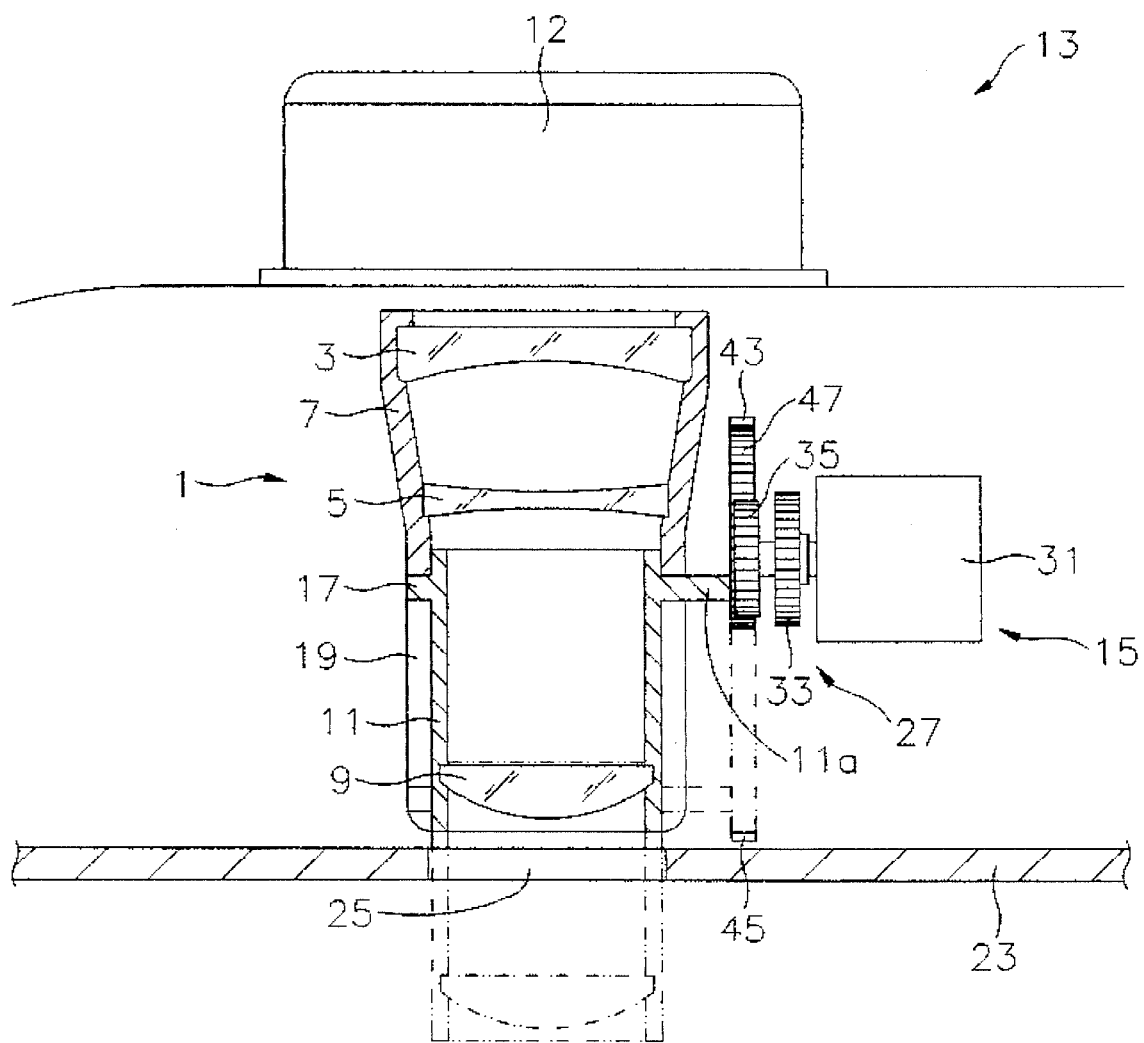
FIG. 4 is a side sectional view of the camera finder system according to a second preferred embodiment of the present invention.

FIG. 4 is a side sectional view showing the main parts of the camera finder system according to a second preferred embodiment of the present invention. The principle of the second embodiment is similar to the first embodiment, and FIG. 4 specifically illustrates the power transmission means.

The power transmission means 27 has a rack 47 connected by a connecting member 11a to the variable housing 11 through the driving gear 33 and the reduction gear group 35 provided on a rotor of the motor 31. In response to an ON or OFF operation of the switch 29, the forward or backward turning effect of the motor 31 is transferred to the rack 47 through the driving gear 33 and the reduction gear group 35. The rack 47 is linearly transferred, such that the variable housing 11 is selectively moved forward or backward along the guide groove 19 in the finder housing 7, as shown by dotted and solid lines in FIG. 4. The second embodiment provides the same advantages and results as the first embodiment.

Figure 5:
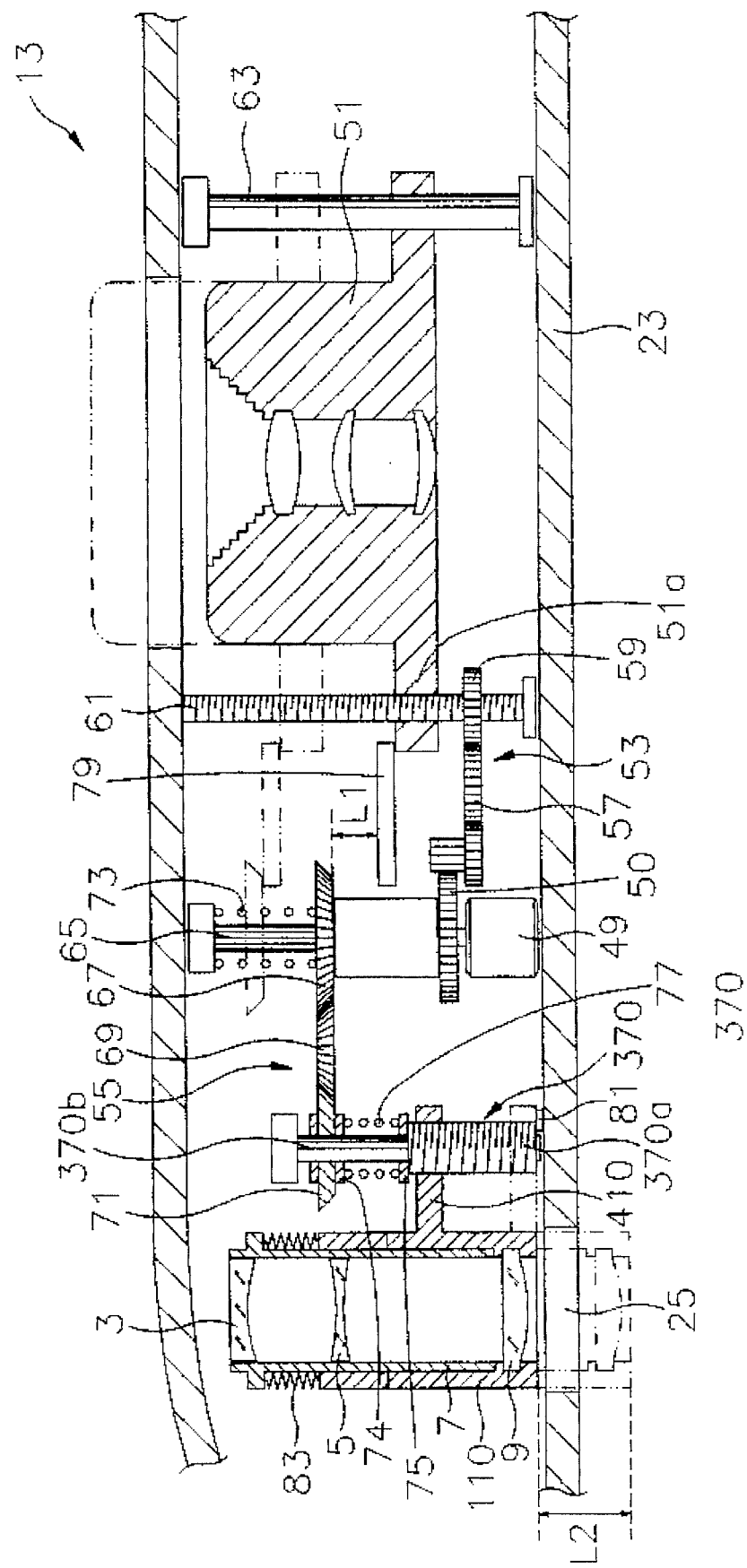
FIG. 5 is a sectional view of the camera finder system according to a third preferred embodiment of the present invention.

FIG. 5 shows a third embodiment of the present invention. Referring to FIG. 5, the camera includes an auto focus driving motor 49 which operates in response to an ON or OFF operation of a switch (not shown). A first power transmission means 53 transfers a turning effect of the auto focus driving motor 49 to selectively move a lens barrel 51 forward spirally and allow focusing. A second power transmission means 55 transfers the turning effect of the auto focus driving motor 49 and moves a variable housing 110. The variable housing 110 has an eyepiece lens 9 positioned on a circumferential surface of a finder housing 7 and guided into the finder housing 7 by the second power transmission means 55.

In the third embodiment, the lens barrel 51 moves spirally forward by the turning effect of the auto focus drive motor 49, which operates in response to the ON or OFF operation of the camera power switch. Concurrently, the variable housing 110 moves to the direction of the user.

The first power transmission means 53 includes a first driving gear 50 positioned on a rotor of the auto focus driving motor 49, a reduction gear group 57 for reducing the turning effect of the auto focus driving motor 49, a first driven gear 59 engaged with the reduction gear 57, and a first rotary member such as ball screw 61 supported by the rotor to the camera body 13. The turning effect of the auto focus driving motor 49 is transferred to the first ball screw 61, and the lens barrel 51 is guided along a guide rod 63 through an interactive operation of the first ball screw 61 and a first linear member such as ball nut 51a. Accordingly, the camera is placed in a stand-by mode ready to take a photograph.

The second power transmission means 55 also includes a second driving gear 67 formed on a spline shaft 65 connected to the rotor of the auto focus driving motor 49, a second driven gear 71 for receiving the turning effect of the motor 49 through the second driving gear 67 and at least one or more idle gears 69, and a second rotary member such as ball screw 370 supported by the rotor to the camera body 13. The variable housing 110 is linearly moved when receiving the turning effect of the second driven gear 71. A second linear transfer member such as ball nut 410 engaged with the second ball screw 370 is linearly guided by the turning effect of the auto focus driving motor 49, and the variable housing 110 connected to the second ball nut 410 moves towards an user through a hole 25 formed at the back cover 23 of the camera.

The second driving gear 67 is elastically supported by an elastic member 73 of the second power transmission means 55 to selectively transfer the power, and is slidably formed along the spline shaft 65.

The second ball screw 370 of the second power transmission means 55 has a large diameter portion 370a having a screw portion and a small diameter portion 370b without the screw portion. The second driven gear 71 is formed at the small diameter portion 370b of the second ball screw 370 to idle up and formed elastically by the elastic member 77 on spring sheets 74 and 75, respectively. When the second driven gear 71 is not burdened, the second driven gear 71 is united with the second ball screw 370 and is rotated, and when the transfer of the variable housing 110 is complete and the rotation of the second ball screw 370 is continued, the overload is prevented.

An intermittent lever 79 is positioned at one side of the lens barrel 51 to intermittently contact the second driving gear 67 of the second power transmission means 55 connected to the rotor of the auto focus driving motor 49, and to intermittently contact the power transmission in accordance with a difference between the transfer distance of the variable housing 110 and the forward movement distance, which is the stand-by mode of the lens barrel 51 to take the photograph. Also, a stopper 81 is formed at one end of the second ball screw 370 limiting the transfer distance of the variable housing 110 linearly guided by the second ball screw 370 of the second power transmission means 55. Moreover, the variable housing 110 is elastically supported by the finder housing 7 and an elastic member 83 to allow safe movement.

In the third embodiment of the present invention as described above, when the user turns ON the switch to take a photograph of an object, the turning effect of the auto focus driving motor 49 operates backward and is reduced to a predetermined speed by the reduction gear group 57 of the first power transmission means 53. The turning effect of the auto focus driving motor 49 is transferred to the first ball screw 61, and the first ball nut 51a of the lens barrel 51, engaged with the first ball screw 61 is linearly moved, such that the lens barrel 51 is guided along the guide rod 63. Accordingly, the camera is placed in the stand-by mode ready to take the photograph, as indicated by a dotted line in FIG. 5.

At this time, as the spline shaft 65 connected to the rotor of the auto focus driving motor 49 is rotated, the turning effect of the motor 49 is transferred to the second driven gear 71 by the second driving gear 67 of the second power transmission means 55, such that the second ball screw 370 is supported by the pressure of the elastic member 77 elastically formed at the respective spring sheets 74 and 75, and engaged with the second driven gear 71. Accordingly, the second ball nut 410 engaged with the second ball screw 370 is linearly moved, and concurrently, the variable housing 110 connected to the second ball nut 410 is linearly moved.

Since the transfer distance of the variable housing 110 is limited by the stopper 81, the variable housing 110 connected to the second ball nut 410 is guided into the finder housing 7 is transferred toward the user as indicated by the dotted line, to make it convenient for the user when taking a photograph.

When the lens barrel 51 moves forward spirally, since a distance L1 (where the intermittent lever 79 and the second driving gear 67 contacts) and a distance L2 (where the variable housing 110 is moved) are designed to be different, the lens barrel 51 is placed in the stand-by mode ready to take the photograph. Since the variable housing 110 is stopped by the stopper 81 after the transfer of the variable housing 110 is complete, a load is produced as the turning effect of the auto focus driving motor 49 is transferred by the second power transmission means 55. However, the second driven gear 71 provided in the small diameter portion 370b of the second ball screw 370 overcomes the elastic force of the elastic member 77, and idles up. Accordingly, the load can be prevented in advance.

When the transfer of the variable housing 110 is complete, as the lens barrel 51 is being moved, the second driving gear 67 overcomes the elastic force of the elastic member 73 by the intermittent lever 79 provided at one side of the lens barrel 51 and is slid along the spline shaft 65 and separated from the idle gear 69. Hence, the turning effect of the auto focus driving motor 49 transferred to the second power transmission means 55 is discontinued.

As described above, when the user turns OFF the switch after completing the photographing or carrying the camera such that the lens barrel 51 and the variable housing 110 of the finder 1 are selectively moved forward spirally and the camera is placed in a stand-by mode ready to take the photograph, the turning effect of the auto focus driving motor 49 is transferred to the first ball screw 61 through the first power transmission means 53. The lens barrel 51 moves opposite to the above-mentioned operation as the auto focus driving motor 49 is operated opposite to the above-mentioned operation.

Accordingly, the second driving gear 67 of the second power transmission means 55, of which the power transmission is discontinued by the intermittent lever 79, returns to an initial state by restoring the force of the elastic member 73 and engages with the idle gear 69. The turning effect of the auto focus driving motor 49 is transferred to the second ball screw 370 of the second power transmission means 55. The variable housing 110 is moved opposite to the above-mentioned operation and received into the finder housing 7. Concurrently, the lens barrel 51 is received into the camera body 11. As a result, the third embodiment provides same advantages and result as in the first embodiment.

The finder 1 is driven by the auto focus driving motor 49 in the third embodiment. However, the scope of the present invention is not limited to this. It should be understood that an additional motor for driving the finder 1 can be provided or any one of the motors attached to the camera can be applied to drive the finder 1.

Figure 6:
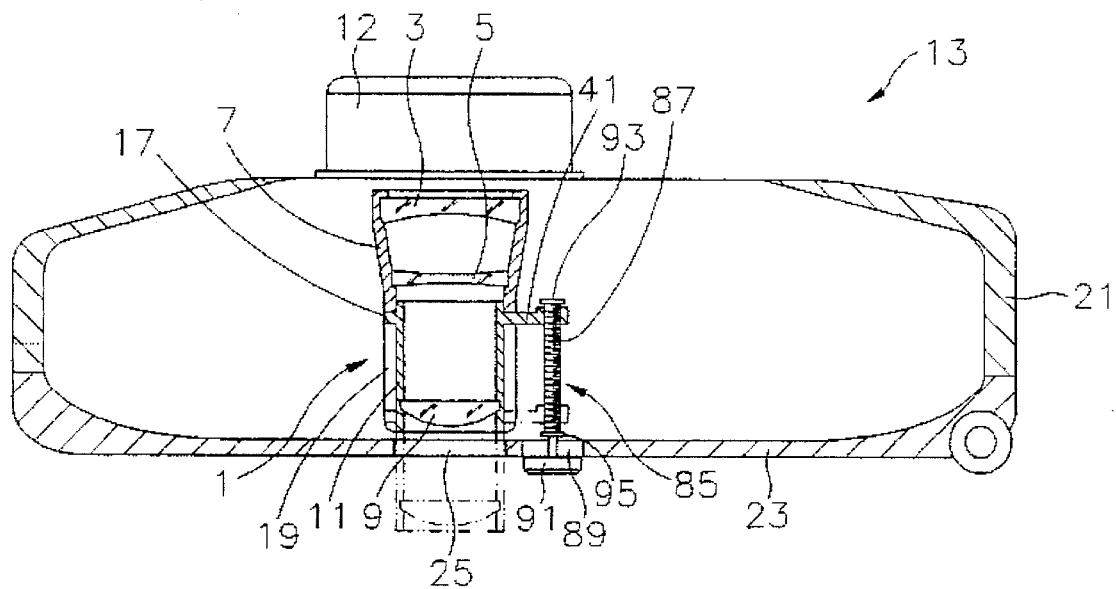
FIG. 6 is a sectional view of the camera finder system according to a fourth preferred embodiment of the present invention.

FIG. 6 shows a fourth embodiment of the present invention. Referring to FIG. 6, the camera includes a finder housing 7 in which an objective lenses 3 and one or more intermediate lens 5 are sequentially mounted. The camera includes a variable housing 11 in which an eyepiece lens 9 is received and is slidable in and out of the finder housing 7. The camera also includes drive means 85 for selectively transferring the variable housing 11.

A guide projection 17 formed at one side of the variable housing 11 is linearly guided along a guide groove 19 formed in the finder housing 7. The variable housing 11 can be projected out of a hole 25 at a back cover 23, such that it is convenient for the user when determining the composition range of the object.

The finder driving system includes a rotation member such as a ball screw 87 supported by the rotor to the camera body 13 and linear transfer member such as a ball nut 41 which is engaged with the rotation member, linearly guided and connected to the variable housing 11. The finder driving system includes a rotation driving member such as a handle 91 fixed at one end of the rotation member and penetrating through another hole 89 formed at the back cover 23. The handle 91 is provided outside the hole 89 and the variable housing 11 is selectively moved forward spirally in response to the operation of the handle 91.

Stoppers 93 and 95 are provided to limit the movable distance of the variable housing 11, namely, the ball nut 41 at both ends of the ball screw 87.

In the fourth embodiment of the present invention as described above, when the user manually rotates the handle 91 to take a photograph of an object, the ball screw 87 is linearly moved. The variable housing 11 connected to the ball nut 41 is mowed to protrude out of the hole 25 at the back cover 23 along the guide groove 19 in the finder housing 7, as indicated by the dotted line in FIG. 6. Accordingly, the fourth embodiment also provides convenience to the user when taking a photograph.

At this time, the transfer of the variable housing 11 is limited by the stopper 95 provided at one end of the ball screw 87, and thus, an eyepiece lens 9 suitable for the design size of the finder 1 can be used when the photographing is complete or when the camera is not in use, the handle 91 in the drive means 85 can be rotated in the opposite direction to the above-mentioned operation to move the variable housing 11 into the finder housing 7. As a result, the fourth embodiment provides the same effect as in the first embodiment.

Figure 7:
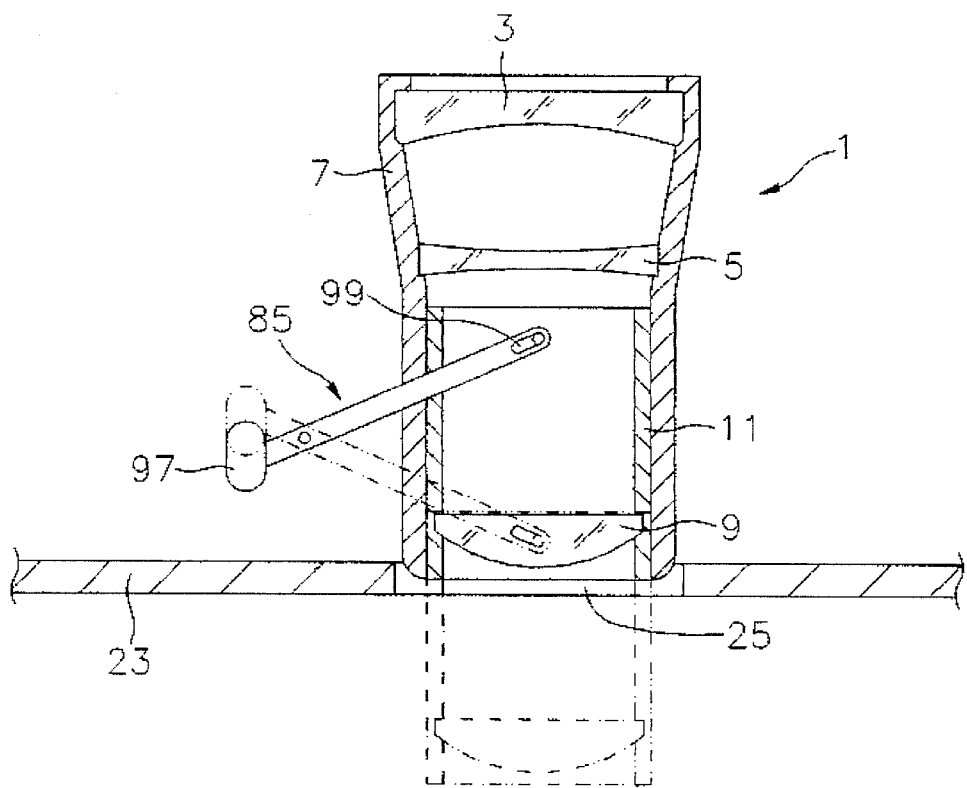
FIG. 7 is a sectional view of the camera finder system according to a fifth preferred embodiment of the present invention.

FIG. 7 shows a fifth embodiment of the present invention. Referring to FIG. 7, the variable housing 11 received in the finder housing 7 is connected to a swinging lever 97 which is a part of the drive means 85. The drive means 85 is fixed by a hinge to the camera body 13. A slot 99 is formed at an end of the swinging lever 97, thereby receiving a projection formed on the variable housing 11.

The swinging lever 97 is rotated about a hinge point to make an arc-shaped trace. As a result, the variable housing 11 is moved spirally forward toward the eye of the user in response to the operation of the swinging lever 97, as indicated by the dotted line. Accordingly, the fifth embodiment provides convenience to the user when determining the composition range of the object and provides the same effect as in the first embodiment.

Figure 8:
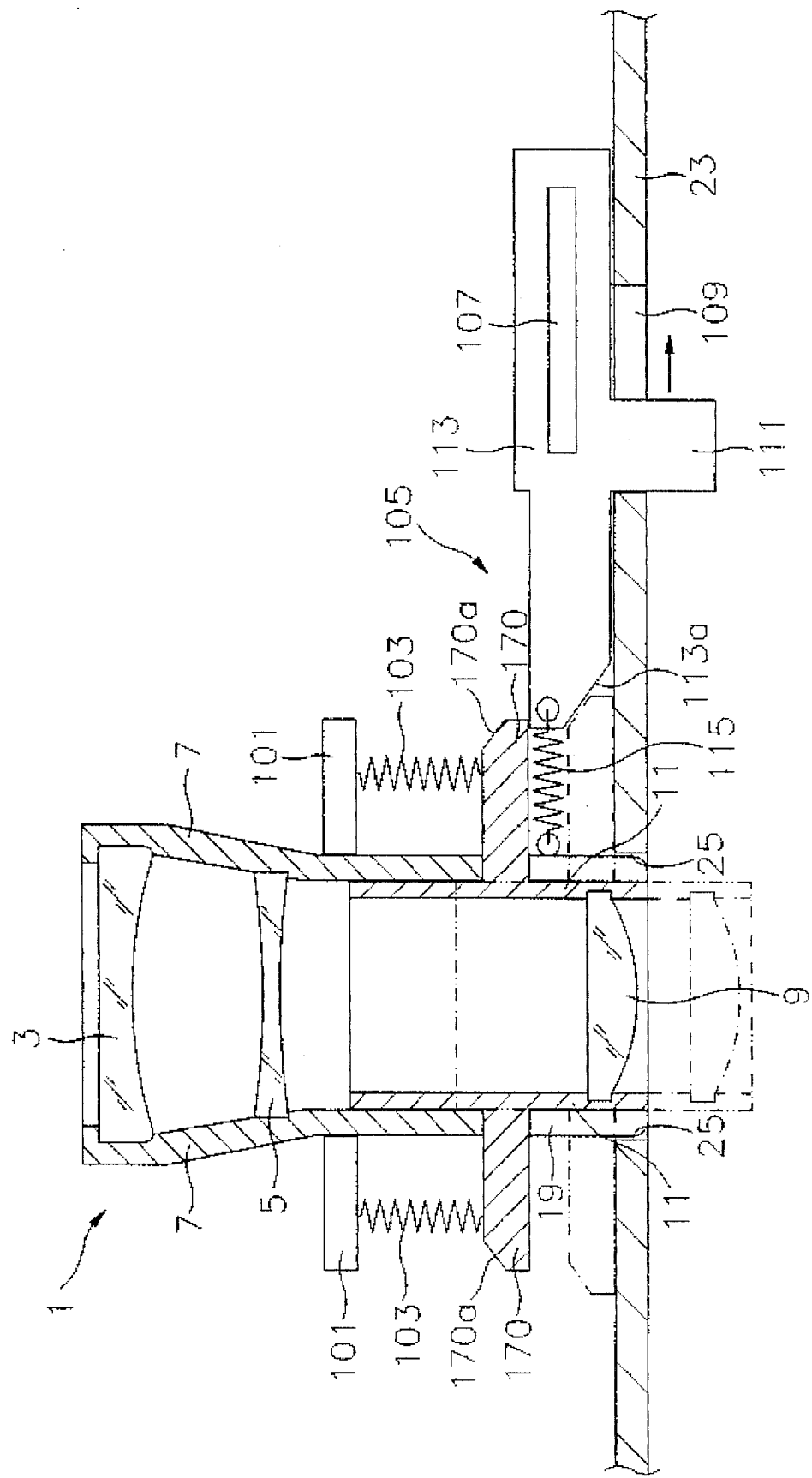
FIG. 8 is a sectional view of the camera finder system according to a sixth preferred embodiment of the present invention.

FIG. 8 shows a sixth embodiment of the present invention. Referring to FIG. 8, the finder 1 includes a finder housing 7 in which an objective lens 3 and one or more intermediate lens 5 are mounted in sequence and a variable housing 11 in which an eyepiece lens 9 is received. The variable housing 11 is slidably formed along a guide groove 19 in the finder housing 7 and an elastic member 103 is elastically supported at a guide groove 170 extended from both ends of the variable housing 11. An operating means 105 selectively operates the variable housing 11. The elastic member 103, which is elastically formed at the guide projection 170 in the variable housing 11, is elastically coupled to a spring sheet 101 provided in the finder housing 7 and provides a pressure spring having repelling power.

The operating means 105 selectively limits the guide projection 170 of the variable housing 11 and is formed slidably along the guide groove (not shown) formed in the camera body at both ends of a guide rail 107. Also, the operating means 105 includes a lever 113 having a knob 111 protruding out of a slide hole 109 at the back cover 23 and an elastic member 115 for elastically pressing the lever 113 in one direction. Accordingly, the selective operation of the lever 113 and the elastic force of the elastic member 103 moves the variable housing 11.

The elastic members 103 and 115 are disengageably disposed with respect to one another in the manner, as shown in FIG. 8, that the elastic members 103 and 115 will not engage one another when the variable housing 11 is moved. Slant faces 170a and 113a are respectively formed in an upper portion of one end of the guide projection 170 and a lower portion of one end of the lever 113 to allow a smooth contact of the faces of the lever 113 and the guide projection 170.

In the sixth embodiment of the present invention as described above, when the user slides the knob 111 of the lever 13 in the direction of the arrow shown in FIG. 8 to take a photograph of an object, the lever 113 slides toward the camera body 11 and releases the guide projection 170 of the variable housing 11. Concurrently, the variable housing 11 is guided to the finder housing 7 by the elastic force of the elastic member 103, passes through the hole 25 at the back cover 23, as shown by the dotted line, and is transferred toward the user. Accordingly, the sixth embodiment also provides convenience for the user when determining the composition range of the object.

When the knob 111 is released, the lever 113 returns to the initial state from the restoring force of the elastic member 115, the contact between the slant faces 170a and 113a of the guide projection 170 and the lever 113 is maintained. Accordingly, the variable housing 11 is maintained in the protruding position from the back cover 23.

When the photographing is complete or when carrying the camera in this state, if the user pushes the variable housing 11 into the camera with a predetermined force, the slant faces 170a, 113a of the guide projection 170 and the lever 113 are contacted one an other, the variable housing 11 is smoothly slid, the lever 113 overcomes the elastic force of the elastic member 115, is guided in the arrow direction, and concurrently the guide projection 170 of the variable housing 11 maintains the initial state. At this time, the lever 113 returns to the initial state by the restoring force of the elastic member 115, restricts the variable housing 11, thereby the reception state in the finder housing 7 is maintained. As a result, the effect of the operation is the same to that of the first embodiment.

In addition, the present invention can be applied to a finder in a zoom camera. The finder lens includes three sheets in the first embodiment of the present invention and the range of the object is determined by moving the variable housing in which the eyepiece lens is mounted when taking the photograph of the object. However, it is not limited to this construction. The construction of the finder lens is flexibly designed on the basis of a specification of the camera. Accordingly, it is possible to determine the composition range of the object by transferring the entire construction of the lens when moved spirally forward, and it depends on the user's intention to move a plurality of lens.

As described above, the camera finder system and related control method of the present invention has advantages in that the finder is received into the camera when the user is not taking a photograph of an object. However, when the camera is placed in a stand-by mode ready to take a photograph as intended by the user, the nose of the user will not contact the back cover of the camera. Accordingly, the present invention makes it convenient for the user to take a photograph since the variable housing in which the eyepiece lens of the finder is received is moved spirally toward the user's eye by either an electric switch or mechanical operation.

It will be apparent to those skilled in the art that various modifications and variations can be made in the camera and method of the present invention without departing from the spirit or scope of the invention. Thus, it is intended that the present invention cover the modifications and variations of this invention provided they come within the scope of the appended claims and their equivalents.

What is claimed is:

1. A camera having a finder system, comprising:
   a camera body having an opening;
   a finder housing, mounted within the camera body;
   a movable housing linearly movable into the finder housing and out of the finder housing whereby the movable housing is correspondingly moved out of the camera body opening or into the camera body opening, respectively; and
   drive means for linearly moving the movable housing.

2. The camera according to claim 1, further comprising power transmission means for transferring a driving force from the drive means to the movable housing to linearly move said movable housing, wherein said power transmission means includes a reduction gear group and said drive means includes a driving gear, the reduction gear group being engaged with the driving gear and the reduction gear group reducing the number of rotations of the driving gear, the power transmission means further including:
   a driven gear engaged with the reduction gear group;
   a rotary member rotatably supported by the camera body, the driven gear being disposed on the rotary member; and
   a linear transfer member connected to the movable housing by a connecting member and engaged with the rotary member, the linear transfer member being moved linearly when the rotary member is rotated.

3. The camera according to claim 1, further comprising power transmission means for transferring a driving force from the drive means to the movable housing to linearly move said movable housing, wherein said power transmission means includes a reduction gear and the drive means includes a driving gear, the reduction gear being engaged with the driving gear and reducing the number of rotations of the driving gear, the power transmission means further including a rack connected to the movable housing by a connecting member passing through the finder housing, a turning effect of said drive means being converted to a linear motion by the rack to linearly move the movable housing.

4. The camera according to claim 1, wherein said finder housing has a guide groove on one side, receives a guide projection formed in the movable housing, and guides the linear motion of said movable housing through the guide groove and guide projection.

5. The camera according to claim 1, further comprising a drive controlling means having a pair of switches positioned respectively at an initial reception position and at a maximum protrusion position of the movable housing and connected electrically to said drive means, and based on signals received through said pair of switches, the drive controlling means transmitting a signal to said drive means when the movable housing is at the maximum protrusion position and controls a movement of said drive means.

6. A camera having a finder system comprising:
  a movable lens barrel having a photographic lens therein;
  a finder housing, mounted within the camera, having a plurality of lenses and a circumferential surface;
  a movable housing having a fixed eye lens, the movable housing being movably attached to the circumferential surface of said finder housing;
  drive means for driving said lens barrel and movable housing;
  a first power transmission means for transferring a driving force from said drive means to said lens barrel; and
  a second power transmission means for transmitting the driving force from said drive means to said movable housing, the driving force of said drive means being respectively transferred to said lens barrel and movable housing through said first and second power transmission means, said lens barrel and movable housing being linearly moved.

7. The camera according to claim 6, further comprising a motor having a rotor, said drive means including:
  a first driving gear fixed to the rotor of the motor;
  a spline shaft extended from the rotor; and
  a second driving gear elastically formed at the spline shaft by an elastic member.

8. The camera according to claim 7, wherein said first power transmission means includes:
  a reduction gear group engaged with said first driving gear;
  a first rotary member rotatably supported by a camera body and having a first driven gear engaged with said reduction gear group; and
  a first linear transfer member connected to said lens barrel and engaged with said first rotary member.

9. The camera according to claim 6, wherein said second power transmission means includes:
  an idle gear engaged with the second driving gear;
  a second rotary member rotatably supported by the camera body and having a second driven gear engaged with said idle gear; and
  a second linear transfer member connected to the movable housing and engaged with said second rotary member.

10. The camera according to claim 8, further comprising:
  a lever extended from the first linear transfer connected to the lens barrel by a predetermined length; and
  means for moving the lens barrel by a set distance, wherein a movement of the lens barrel moves the lever to subsequently move the second driving gear along the spline shaft and discontinue transfer of a turning effect of the second power transmission means.

11. The camera according to claim 9, wherein the second rotary member has a first diameter portion engaged with said second linear transfer and a second diameter portion, the second driven gear moving in the direction of the second diameter portion when the movable housing is transferred to a maximum distance.

12. The camera according to claim 11, further comprising an elastic member formed by a spring sheet between the first diameter portion and the second diameter portion of the second rotary member to press and support the second driven gear, the first diameter portion being larger than the second diameter portion.

13. The camera according to claim 10, wherein a first distance between the lever and the second driving gear is set to be longer than a maximum movable distance of the movable housing to allow the lever and the second driving gear to contact each other after the movable housing is moved to the maximum distance.

14. The camera according to claim 6, further comprising a guide rod at one end of the lens barrel to linearly guide the lens barrel.

15. A camera having a finder system, comprising:
  a camera housing having an opening;
  a finder housing having a plurality of lenses;
  a movable housing having a plurality of lenses moved by the movable housing and slidably receivable into the finder housing; and
  drive means for moving the movable housing into and out of the opening formed at the camera housing.

16. The camera according to claim 15, further comprising a rotor, the drive means including:
  a rotary member supported by the rotor to a camera body;
  a rotion driving member disposed at an end portion of the rotary member and exposed outside the camera body; and
  a linear transfer member extended from the movable housing and engaged with the rotary member, the movable housing being linearly transferred by an interactive operation of the rotary member and the linear transfer member when the rotation driving member is manually rotated.

17. The camera according to claim 16, wherein the finder housing includes a guide groove for a guide projection protruding from said movable housing at one side, and a piercing portion through which the linear transfer member passes through at another side.

18. The camera according to claim 15, wherein the drive means include a swinging lever fixed by a hinge to the camera body, the swinging lever having a rotation driving member at one end and a slot at another end receiving a projection from the movable housing, the movable housing being movable in and out of the finder housing by the hinge movement of the swinging lever.

19. A camera having a finder system, comprising:
  a finder housing having a plurality of lenses for a finder, a guide groove at each of two sides, and a spring sheet;
  a movable housing receivable into the finder housing, the movable housing having a guide projection exposed through the guide groove at said two sides;
  an elastic member formed between the guide projection of the movable housing and the spring sheet of the finder housing, the elastic member providing an elastic force to the movable housing;
  a guide rail having one end connected to the guide projection of the movable housing and another end slidably formed along a groove of a camera body; and
  a lever having a knob exposed out through a slide hole formed in the camera body at one end of the guide rail, the lever having an end portion contacting the guide projection at an initial position, said lever being slidable in a direction opposite the finder housing to release the contact between the end portion of the lever and the guide projection of the movable housing and move the movable housing out through another hale formed in the camera body by the elastic force of the elastic member.

20. The camera according to claim 19, wherein a spring is attached at the end portion of the lever and at the guide groove, the spring automatically returning the lever to the initial position after being forcibly moved in the direction opposite the finder housing.

21. The camera according to claim 19, wherein the lever contacts the guide projection at corresponding end portions of the lever and guide projection, the corresponding end portions having slanted surfaces to allow a smooth sliding release between the end portions when the movable housing is received back into the finder housing and the lever is moved in the direction opposite of the finder housing.

22. A method for controlling a finder of a camera, comprising the steps of:

checking whether power in the camera is sufficient; and supplying power to a camera motor in the camera to cause the camera motor to rotate to move the finder from within the body of the camera toward an eye of a user.

23. The method according to claim 22, wherein the power supplying step includes causing the motor to rotate in a direction to move the finder away from the eye of the user and into the camera body when photographing is complete.

24. A camera having a finder system comprising:

a motor having a rotor;

a movable lens barrel having a photographic lens therein;

a finder housing having a plurality of lenses and a circumferential surface;

a movable housing having a fixed eye lens, the movable housing being movably attached to the circumferential surface of said finder housing;

drive means for driving said lens barrel and movable housing, said drive means including a first driving gear fixed to the rotor of the motor, a spline shaft extended from the rotor, and a second driving gear elastically formed at the spline shaft by an elastic member;

a first power transmission means for transferring a driving force from said drive means to said lens barrel; and a second power transmission means for transmitting the driving force from said drive means to said movable housing, the driving force of said drive means being respectively transferred to said lens barrel and movable housing through said first and second power transmission means, said lens barrel and movable housing being linearly moved.

25. A camera having a finder system comprising:

a movable lens barrel having a photographic lens therein;

a finder housing having a plurality of lenses and a circumferential surface;

a movable housing having a fixed eye lens, the movable housing being movably attached to the circumferential surface of said finder housing;

drive means for driving said lens barrel and movable housing;

a first power transmission means for transferring a driving force from said drive means to said lens barrel, said first power transmission means comprising a reduction gear group engaged with said first driving gear, a first rotary member rotatably supported by a camera body and having a first driven gear engaged with said reduction gear group, and a first linear transfer member connected to said lens barrel and engaged with said first rotary member; and a second power transmission means for transmitting the driving force from said drive means to said movable housing, the driving force of said drive means being respectively transferred to said lens barrel and movable housing through said first and second power transmission means, said lens barrel and movable housing being linearly moved.

26. A camera having a finder system, comprising:

a finder housing having a plurality of lenses;

a movable housing having a plurality of lenses moved by the movable housing and slidably receivable into the finder housing;

drive means for moving the movable housing forward and backward through a hole formed at a camera housing;

a rotor;

a rotary member supported by the rotor to a camera body;

a rotation driving member disposed at an end portion of the rotary member and exposed outside the camera body; and a linear transfer member extended from the movable housing and engaged with the rotary member, the movable housing being linearly transferred by an interactive operation of the rotary member and the linear transfer member when the rotation driving member is manually rotated.

27. A camera having a finder system, comprising:

a finder housing having a plurality of lenses;

a movable housing having a plurality of lenses moved by the movable housing and slidably receivable into the finder housing;

drive means for moving the movable housing forward and backward through a hole formed at a camera housing;

wherein the drive means further comprises a swinging lever fixed by a hinge to the camera body, the swinging lever having a rotation driving member at one end and a slot at another end receiving a projection from the movable housing, the movable housing being movable in and out of the finder housing by the hinge movement of the swinging lever.

28. A camera having a finder system, comprising:

a finder housing having a plurality of lenses for a finder, a guide groove at each of two sides, and a spring sheet;

a movable housing receivable into the finder housing, the movable housing having a guide projection exposed through the guide groove at said two sides;

an elastic member formed between the guide projection of the movable housing and the spring sheet of the finder housing, the elastic member providing an elastic force to the movable housing;

a guide rail having one end connected to the guide projection of the movable housing and another end slidably formed along a groove of a camera body; and a lever having a knob exposed out through a slide hole formed in the camera body at one end of the guide rail, the lever having an end portion contacting the guide projection at an initial position, said lever being slidable in a direction opposite the finder housing to release the contact between the end portion of the lever and the guide projection of the movable housing and move the movable housing out through another hale formed in the camera body by the elastic force of the elastic member;

wherein a spring is attached at the end portion of the lever and at the guide groove, the spring automatically returning the lever to the initial position after being forcibly moved in the direction opposite the finder housing.

29. A camera having a finder system, comprising:

a finder housing having a plurality of lenses for a finder, a guide groove at each of two sides, and a spring sheet;

a movable housing receivable into the finder housing, the movable housing having a guide projection exposed through the guide groove at said two sides;

an elastic member formed between the guide projection of the movable housing and the spring sheet of the finder housing, the elastic member providing an elastic force to the movable housing;

a guide rail having one end connected to the guide projection of the movable housing and another end slidably formed along a groove of a camera body; and a lever having a knob exposed out through a slide hole formed in the camera body at one end of the guide rail, the lever having an end portion contacting the guide projection at an initial position, said lever being slidable in a direction opposite the finder housing to release the contact between the end portion of the lever and the guide projection of the movable housing and move the movable housing out through another hale formed in the camera body by the elastic force of the elastic member;

wherein the lever contacts the guide projection at corresponding end portions of the lever and guide projection, the corresponding end portions having slanted surfaces to allow a smooth sliding release between the end portions when the movable housing is received back into the finder housing and the lever is moved in the direction opposite of the finder housing.

* * * * *

UNITED STATES PATENT AND TRADEMARK OFFICE
CERTIFICATE OF CORRECTION

PATENT NO. : 5,539,490
DATED : July 23, 1996
INVENTOR(S) : Hyeong-won KANG et al It is certified that error appears in the above-indentified patent and that said Letters Patent is hereby corrected as shown below:

Claim 16, column 12, line 31, "rotion" should read --rotation--.

Claim 19, column 13, line 6, "hale" should read --hole--.

Claim 28, column 15, line 1, "hale" should read --hole--.

Claim 29, column 16, line 10, "hale" should read --hole--.

Signed and Sealed this

Thirteenth Day of May, 1997

*Attest:*

BRUCE LEHMAN

*Attesting Officer*     *Commissioner of Patents and Trademarks*